Feb. 5, 1946.　　J. R. WRATHALL ET AL　　2,394,131
DYNAMOMETER
Filed April 26, 1943
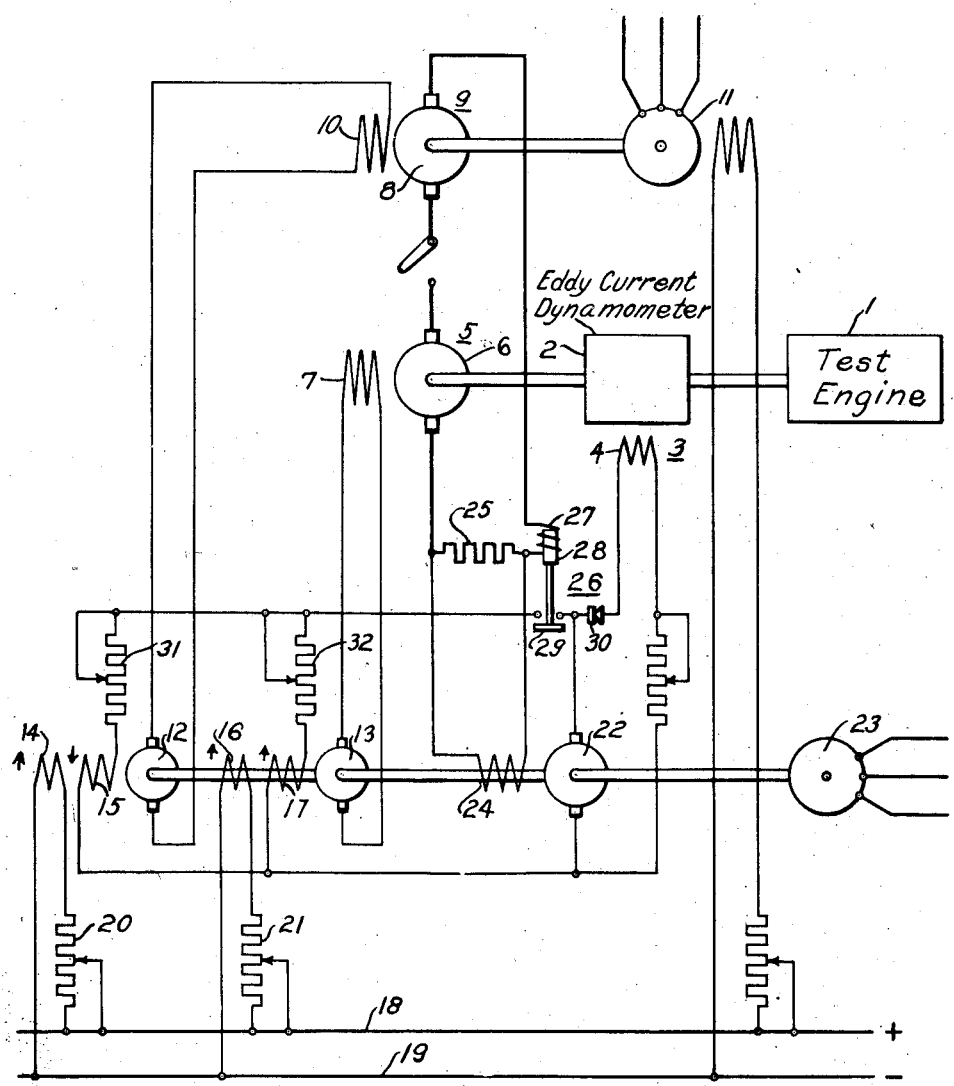
WITNESSES:
INVENTORS
Jay R. Wrathall and
Russell L. Findley.
BY
Paul E. Friedemann
ATTORNEY Patented Feb. 5, 1946

2,394,131

UNITED STATES PATENT OFFICE 2,394,131

DYNAMOMETER

Jay R. Wrathall, Pittsburgh, Pa., and Russell L. Findley, Detroit, Mich., assignors to Westinghouse Electric Corporation, East Pittsburgh, Pa., a corporation of Pennsylvania Application April 26, 1943, Serial No. 484,540

11 Claims. (Cl. 73—116)

This invention relates to dynamometers and more particularly to a control system for automatically regulating the operation of a direct current dynamo used either alone or in combination with an eddy current inductor dynamometer.

The use of a direct current dynamo mounted in the cradle of a dynamometer for the purpose of either driving or loading an engine to be tested is well known. Such dynamos are commonly employed in combination with a dynamometer of the eddy current inductor type since the load which can be provided by the direct current dynamo is limited. The dynamo is usually operated as a motor for cranking the engine being tested, and to run tests on the engine at various speeds. After the engine has been started and is operating under its own power the dynamo is operated as a generator for the purpose of loading the engine being tested. In such case the dynamo provides only a portion of the load on the test engine, the remainder of the loading being provided by the eddy current dynamometer.

In dynamometer systems of the character referred to, difficulty has been encountered in proportioning the load on the test engine between the eddy current dynamometer and the direct current dynamo. This has been due to the fact that the speed load characteristics of the dynamo and eddy current dynamometer are considerably different. For a given increase in speed of operation, the dynamo being operated as a generator will take up a larger proportionate share of the load on the test engine than will the eddy current dynamometer. Since it is necessary that the eddy current dynamometer take up a larger proportion of the load, it will be seen that both machines must be regulated to adjust for differences in the speed load characteristics thereof and to insure the proper loading of the eddy current dynamometer to prevent overloading of the direct current dynamo.

A further difficulty is encountered in regulating the load on the dynamo when it is being operated either as a motor or as a generator. It is, of course, necessary that the dynamo be not overloaded and protective overload relays are provided for the purpose of preventing damage to the dynamo. However, it is desirable to prevent conditions arising which would cause operation of the overload protective devices. This latter feature is particularly true when tests are being run on an engine which require considerable time since operation of the overload protecting devices require that the apparatus be stopped and the test be started over again. This may result in a loss of several hours.

One of the principal objects of this invention is to provide an improved control system for automatically regulating the operation of a direct current dynamo in dynamometer apparatus which will be effective to prevent overloading of the dynamo and consequent stopping of its operation.

A further object is to provide an improved control system for preventing overloading of a direct current dynamo being used as a dynamometer in which the control parts for preventing overloading are rendered operative in response to the current in the armature circuit of the dynamo.

A further object of this invention is to provide an improved control system for automatically proportioning the load between a direct current dynamo and an eddy current dynamometer used together in dynamometer apparatus.

Other objects and advantages of this invention will become apparent from the following description and the accompanying drawing in which the single figure diagrammatically illustrates a dynamometer and control devices therefor constructed in accordance with the principles of this invention.

Referring to the drawing, the numeral 1 designates a prime mover or engine to be tested which may be an internal combustion engine or any other form of power plant for producing power. The test engine is shown as connected to the rotor or armature 2 of an eddy current inductor dynamometer 3 which is provided with a control field winding 4. The control field winding 4 is in the stator of the dynamometer 3. The stator and the rotor of the dynamometer 3 are made of iron in which eddy currents will be induced upon energization of the winding 4 and a braking force on the engine being tested will thus be produced. The construction and operation of eddy current dynamometers of this type are well known and the details of the dynamometer 3 are not shown herein since they form no part of the present invention.

The dynamometer 3 is also shown as being connected to a direct current dynamo 5 having an armature 6 and a control field winding 7. The stator of the dynamo 5, as is the case with the stator of the dynamometer 3, is mounted in a cradle (not shown) and connected to a scale beam or other form of torque indicating apparatus in a manner well known in the art. Since the details of the cradle mounting and torque indicating apparatus form no part of this invention, such details have not been shown herein in the interest of simplicity.

The dynamo 5 is adapted to be operated either as a motor to drive the engine 1 or as a generator to load such engine. To this end its armature 6 is electrically connected in series with the armature 8 of a dynamo 9 which is operated at a constant speed and is provided with a control field winding 10. The armature 8 is mechanically connected to the rotor 11 of a synchronous alternating current machine. When the dynamo 5 is to be operated as a motor the alternating current machine 11 will drive the dynamo 9; which will be operated as a generator to supply power to the dynamo 5. When the dynamo 5 is to be operated as a generator to load the engine 1, the dynamo 9 will be operated as a motor to drive the alternating current machine 11 which will feed electric power back into the alternating current supply buses therefor.

The control fields 7 and 10 are energized respectively by exciter generators 13 and 12. The exciter generator 12 is provided with control field windings 14 and 15 and the exciter generator 13 is provided with similar control field windings 16 and 17. The windings 14 and 16 are connected to a suitable source of constant potential direct current power buses 18 and 19. Variable rheostats 20 and 21 are provided for varying the strengths of the respective field windings 14 and 16. The rheostats 20 and 21 are manually adjustable and preferably operated by a common control member of the type shown and described in the copending application of C. R. Hanna and L. A. Kilgore, Serial No. 463,964 field October 30, 1942.

The windings 15 and 17 effect automatic adjustment of the control fields 7 and 10 respectively to prevent overloading of the dynamo 5 in a manner to be described and are shown connected across the armature circuit of an exciter generator 22. The exciter generator 22 is shown as being driven by an alternating current motor 23 which also operates to drive the exciter generators 12 and 13. A field winding 24 is provided for the exciter generator 22 and is connected in the armature circuit of the dynamo 5 so as to make the output voltage of the generator 22 proportional to the current in such circuit. The field winding 24 is connected across a resistor 25. Since the field windings 15 and 17 are to be employed to prevent overloading of the armature circuit of dynamo 5, a relay 26 is provided for connecting such windings to the armature of exciter generator 22. The relay 26 comprises a coil 27 in the dynamo armature circuit and a solenoid 28 for operating a contactor 29 to connect and disconnect the circuits of the control field windings 15 and 17 with the armature of exciter generator 22.

The winding 4 of the eddy current inductor dynamometer 3 is shown as connected in the armature circuit of the exciter generator 22. A rectifier 30 adapted to permit flow of current in a single direction only is connected in the circuit of the field winding 4. The rectifier 30 functions as a valve to permit energization of the winding 4 only when the dynamo 5 is being operated as a generator in a manner to be described.

The operation of the apparatus is as follows: The rheostats 20 and 21 are first adjusted to place full field on the winding 16 and minimum field on the winding 14 and the motors 11 and 23 are then started. The dynamo 9 operates as a generator and the generators 12, 13 and 22 operate as exciter generators. After motors 11 and 23 have reached full speed, the winding 7 will provide full field strength for the dynamo 5, and the field strength of the winding 10 on the dynamo 9 will be at a minimum. Thereafter the rheostat 20 is operated to cut resistance out of the circuit of the winding 14 to increase the strength of the field winding 10 to its maximum value. As soon as this point has been reached, the rheostat 21 may be operated to add resistance in the circuit of the field winding 16 so as to decrease the field strength of the winding 7 in order to effect further increases in the rotational speed of the dynamo 5 being operated as a motor.

If the dynamo 5 becomes overloaded at any time during these operations, the relay 26 will operate to connect the windings 15 and 17 to the armature winding of generator 22. These windings are so arranged that the effect of the windings 14 and 15 are subtractive and the effect of the windings 16 and 17 are additive when the dynamo 5 is being operated as a motor. Accordingly, it will be seen that with the dynamo 5 operating as a motor, operation of the relay 26 will decrease the strength of the field winding 10 and increase the strength of the field winding 7. Either or both of these changes in the field strength of the windings 7 and 10 will function to remove the condition causing the overload current flowing in the armature circuit of the dynamo 5. Due to the connection of winding 24 with resistor 25, the output of the generator 22 is proportional to the current flowing in the armature circuit of the dynamo 5. Hence the regulating effect on the speed load characteristics of the machines 5 and 9 will be proportional to the amount of overload current in the armature circuit.

When the engine 1 is fired and operating under its own power, the dynamo 5 will be driven by the engine and its operation will change from that of a motor to that of a generator. Dynamo 9 is now operated as a motor to drive the alternating current machine 11. Under such conditions of operation, the relay 26 and windings 15 and 17 will again function when an overload current is reached to protect the armature circuit of the dynamo 5 against the overload current. However, under these conditions the flow of current in the armature circuit 5 is reversed and the polarity of the generator 22 is consequently also reversed. Upon operation of the relay 26, the field winding 15 will now be additive with respect to the field winding 14, and the field winding 17 will oppose the winding 16. In this manner, upon operation of the relay 26, the strength of the field winding 10 will be increased and that of the field winding 7 will be decreased for the purpose of reducing the current flowing in the dynamo armature circuit.

The relay 26 is designed to operate when the current in the dynamo armature circuit is at a value less than that effective to operate the overload protective devices (not shown) commonly provided in such circuits. After operation of the relay 26, the generator 22, through the windings 15 and 17 and generators 12 and 13, will function automatically to control the characteristics of the dynamos. This automatic regulation, through proper adjustment of resistors 31 and 32, is so designed that further increases in the current flowing in the dynamo armature are had after operation of the relay 26. However, the action of the generator 22 and associated windings with respect to such increases, will be effective to prevent such current rising to a value at which the protective devices (not shown) referred to above will be operated.

Although the illustrated embodiment provides for a simultaneous adjustment of the fields 7 and 10, it is to be understood that an adjustment of only one of such fields may be employed for the purpose of protecting against overloads without departing from the principles of this invention. However, a simultaneous adjustment of both fields is desirable since such action provides a wider range of adjustment for the dynamos 5 and 9.

When dynamo 5 is operating as a generator to load the test engine 1, the generator 22 becomes effective to energize the field 4 of the eddy current dynamometer 3 which then acts as an eddy current brake on the test engine 1. As the speed of the engine 1 is increased, the dynamo 5 will generate more current, and, in the absence of any further adjustment, will take up more than its share of the load. The increased loading of the dynamo 5 will effect an increase in the current flowing through its armature circuit and thereby increase the strength of the winding 24. The output of the generator 22 will thus be increased and the strength of the field winding 4 will be increased proportionately to cause the eddy current dynamometer 3 to exert a greater braking force and thus relieve the dynamo 5 of some of its load. In this manner the dynamometer 3 is caused to automatically increase its load proportionately to increases in the speed of operation of the dynamo 5.

The rectifier 30 functions as a valve to prevent energization of the winding 4 during operation of the dynamo 5 as a motor and thus prevents undesirable loading of the dynamometer 3 at such time. However, as soon as the dynamo 5 is driven and operated as a generator the rectifier 30 freely permits current to flow in the circuit of the winding 4 and the eddy current dynamometer field 4 is thus immediately built up to place the dynamometer 3 in operation.

From the foregoing it will be seen that the apparatus of this invention is effective to prevent overloading of the dynamo armature circuit and thus automatically prevents conditions which would cause operation of load protective devices and consequent shutting down of the apparatus. It will also be noted that the apparatus of this invention is effective to properly proportion the load on the test engine 1 between the dynamo and eddy current dynamometer 3; at the same time it protects against overloading of the dynamo armature circuit. Both of these automatic regulations are accomplished through the use of the single generator 22, the output of which is made proportional to the current flowing in the armature circuit of dynamo 5.

Since numerous changes may be made in the above described construction, and different embodiments of the invention may be made without departing from the spirit and scope thereof, it is intended that the foregoing description and the accompanying drawing shall be interpreted as illustrative and not in a limiting sense.

We claim as our invention:

1. Apparatus for testing a prime mover comprising, in combination, an eddy current dynamometer comprising a rotary member to be connected with said prime mover and including a control winding for varying the dynamometer absorption capacity, a braking dynamo having an armature mechanically connected to said rotary member and a field winding for controlling the dynamo speed torque characteristics, and control means having an input circuit connected with said armature and including output circuits connected to said windings for inversely varying the field strength of both said windings to prevent overloading of said dynamo upon increase in speed of operation of said prime mover.

2. Apparatus for testing a prime mover comprising, in combination, an eddy current dynamometer comprising a rotary member and a control winding for varying the absorption capacity thereof, a braking dynamo having an armature mechanically connected to said eddy current dynamometer and a field winding for controlling its speed torque characteristics, and means for automatically increasing the strength of said control winding and decreasing the strength of said field winding to prevent said dynamo from taking up more than its share of the load upon increase in speed of operation of said prime mover, said means including a generator having a control field winding in series with said armature.

3. Apparatus for testing a prime mover comprising, in combination, an eddy current dynamometer comprising a rotary member and a control winding for varying the absorption capacity thereof, a dynamo having an armature mechanically connected to said eddy current dynamometer and a field winding for controlling its speed torque characteristics, a generator for energizing said control winding, an exciting field in the armature circuit of said dynamo effective to increase the output of said generator and strength of said control winding with increased loading of said dynamo, and means responsive to increased output of the generator for decreasing the strength of dynamo field winding to prevent said dynamo from taking up more than its share of the load upon increases in the speed of operation of said prime mover.

4. Apparatus as claimed in claim 3 in combination with electric valve means disposed in the circuit of said control winding for preventing current flow therein upon reversal of the output of said generator.

5. Apparatus for testing a prime mover comprising, in combination, an eddy current dynamometer comprising a rotary member and a control winding for varying the absorption capacity thereof, a dynamo having an armature mechanically connected to said eddy current dynamometer and a field winding for controlling its speed torque characteristics, a generator for energizing said control winding, said generator having a field winding connected with the armature circuit of said dynamo, said dynamo being operable as a generator to load said prime mover and as a motor to drive said prime mover, and means in the circuit of said control winding for preventing energization of the same when said dynamo is being operated as a motor.

6. In testing apparatus, the combination of an electric dynamometer and a braking dynamo, each comprising an armature for connection to a driving device to be tested and each having a control field winding, circuit means for energizing one of the control field windings including a rotary generator the output of which is controlled according to electrical characteristics of the braking dynamo, and means electrically related with said armature of said dynamo so as to be responsive to the current in said latter armature for effecting a control of the other of said control field windings in accordance with the output of said generator.

7. In testing apparatus, the combination of an electric dynamometer and a braking dynamo, each comprising an armature for connection to a driving device to be tested and each having a control field winding, circuit means for energizing one of said control field windings including a rotary generator having a variable output, control means connected with said armature of said dynamo for varying the output of said generator proportionately to the current in said latter armature, a second generator having a pair of field windings, circuit means electrically connecting said second generator to energize the other of said control field windings, means for supplying a substantially constant exciting current to one of said pair of field windings of said second generator, and means responsive to the armature current of said braking dynamo for effecting energization of the second of said pair of field windings of said second generator in accordance with the output of said rotary generator.

8. Dynamometric means for testing a prime mover, comprising, in combination, a braking dynamo having an armature mechanically connected with said prime mover and a field winding coacting with said armature, a second dynamo having an armature electrically connected in series with said first armature and a field winding coacting with said latter armature, circuit means for exciting said two field windings, and control means electrically connected with said armatures for controlling said circuit means so as to vary the energization of one of said windings in dependence upon the current flowing through said armatures.

9. Dynamometric means for testing a prime mover, comprising, in combination, a braking dynamo having an armature mechanically connected with said prime mover and a field winding coacting with said armature, a second dynamo having an armature and a field winding, an armature circuit containing said two armatures in series connection, excitation means for each of said field windings, one of said excitation means including a generator of variable output and means for controlling said generator so as to vary its output in dependence upon the current in said circuit to thereby prevent overloading of said circuit.

10. Dynamometric means for testing a prime mover, comprising, in combination, a braking dynamo having an armature mechanically connected with said prime mover and a field winding coacting with said armature, a second dynamo having an armature and a field winding, an armature circuit containing said two armatures in series connection, excitation means for each of said field windings, one of said excitation means including a generator of variable output having a control field winding connected with said armature circuit so as to vary the generator output and hence the excitation provided by said appertaining excitation means in dependence upon the current in said circuit.

11. Dynamometric means for testing a prime mover, comprising, in combination, a braking dynamo having an armature mechanically connected with said prime mover and a field winding coacting with said armature, a second dynamo having an armature and a field winding, an armature circuit containing said two armatures in series connection, and means responsive to the current in said circuit for varying the fields of both of said windings in an inverse manner to thereby prevent overloading of said circuit.

JAY R. WRATHALL.
RUSSELL L. FINDLEY.